United States Patent Office 3,839,389
Patented Oct. 1, 1974

3,839,389
ORGANOPHILIC SWELLING CLAYS
Barbara Susan Neumann, Redhill, England, assignor to Laporte Industries Limited, London, England
No Drawing. Continuation-in-part of application Ser. No. 658,364, Aug. 4, 1967, which is a continuation-in-part of application Ser. No. 416,634, Dec. 7, 1964, both now abandoned. This application Aug. 6, 1970, Ser. No. 61,800
Claims priority, application Great Britain, Dec. 6, 1963, 48,332/63
Int. Cl. C07f 11/10, 11/18
U.S. Cl. 260—448.2 N  4 Claims

ABSTRACT OF THE DISCLOSURE

Synthetic, mineral-like, organophilic swelling clays characterised by:
(a) the general formula:

$$[Si_8 \cdot Mg_{6-x} \cdot Li_x \cdot O_{20}(OH)_{4-y} \cdot F_y]^{x(-)} \cdot xO^+$$

where $O^+$ is an equivalent of an exchangeable organic ammonium cation having at least one chain of at least 18 carbon atoms, $x$ is greater than zero, but less than 6; $y$ is at least 1, but less than 4;
(b) a $d_{001}$ spacing of 38±3 A.; and
(c) containing the same organic ammonium cation held within the structure of the synthetic swelling clay to an amount of at least about 40% in excess of the cation exchange capacity of the clay.

RELATED APPLICATION

This application is a continuation-in-part of copending application Ser. No. 658,364 filed Aug. 4, 1967, now abandoned which itself is a continuation-in-part of application Ser. No. 416,634 filed Dec. 7, 1964, now abandoned.

BACKGROUND OF THE INVENTION

The invention relates to synthetic, organophilic swelling clays and their production. More particularly this invention relates to organophilic swelling clays capable of being formed into organosols and organosols made therefrom.

Many organophilic swelling products have been previously proposed for incorporation into suitable liquid media for the preparation of lubricating greases. For example in U.S. Pat. No. 2,626,899, greases having high water stability are formed by treating an inorganic silicate with a high molecular weight amine and subsequently forming an amine salt. Compositions such as this are capable of producing acceptable greases.

It is also known to aim at producing synthetically a material closely resembling hectorite and a process for this is described by Granquist et al. in "Clays and Clay Minerals" Pergamon Press, New York 1960, pages 150 to 169. Since the clays whose synthesis is described by Granquist et al. are intended to be synthetic hectorites their fluorine content is always low, i.e. in the general formula of the clay there is not more than 0.9 atoms of fluorine.

Although the natural clays and the synthetic equivalents such as those described by Branquist et al. are capable of being converted into organophilic products that can produce acceptable greases it is often not easy to disperse the silicates into many liquid media. For example it would be desirable to be able easily to disperse organophilic clays into paint media but the existing organophilic clays form gels when dispersed in paint media at the required concentration and require considerable effort to achieve satisfactory blending of them into the paint media. It it were possible to incorporate them in the form of a low viscosity organosol or emulsion, it would clearly greatly simplify matters. However, organic derivatives of natural hectorite, and the other presently known organophilic clay products, cannot be formed into organosols.

It is an object of the present invention to provide a synthetic organophilic swelling clay which is readily capable of being formed into an organosol or emulsion.

According to my invention I provide a synthetic silicate structurally analogous to natural hectorite and which is capable of forming an organosol and which has:

(a) the general formula:

$$[Si_8 \cdot Mg_{6-x} \cdot Li_x \cdot O_{20}(OH)_{4-y} \cdot F_y]^{x(-)} \cdot xO^+$$

where $O^+$ is an equivalent of an exchangeable organic ammonium cation having at least one chain of at least 18 carbon atoms, $x$ is greater than zero, but less than 6; $y$ is at least 1, but less than 4;
(b) a $d_{001}$ spacing of 38±3 A.; and
(c) the organic ammonium cation held within the structure of the synthetic swelling clay to an amount of at least about 40% in excess of the cation exchange capacity of the clay.

DETAILED DESCRIPTION OF THE INVENTION INCLUDING PREFERRED EMBODIMENTS

These silicates may be produced by introducing the required excess of organic ammonium cation into a synthetic silicate structurally analogous to natural hectorite and having the general formula quoted or into such a silicate having the general formula quoted but in which the exchangeable cation $O^+$ is a cation other than the specified organic ammonium cation, for example being sodium or lithium. Silicates having the general formula given but in which $O^+$ is an exchangeable sodium or lithium cation are described more fully in my copending U.S. patent Ser. No. 651,107, filed July 5, 1967, now U.S. Pat. 3,586,478, the disclosure of which is incorporated herein by reference. They have a cation exchange capacity between 50 and 120 meq./100 g. and, as a 2% dispersion in tap water, a Bingham Yield Value of from 40 to 250 dynes/cm.$^2$. The term "Bingham Yield Value" may be defined as the shear stress which has to be exceeded before the rate of shear shows a linear relationship to the shear stress, the former being proportional to the difference between the shear stress and the Bingham Yield Value. It is referred to in such standard works on rheology as "Rheology Theory and Applications" Ed. F. R. Eirich (Acad. Press), Volume 1, 1956, page 658.

To obtain these properties it is convenient to produce the synthetic silicate by a particular process and it is desirable to use this same process for the production of the synthetic silicates of the present invention (i.e. those containing the organic cation). This method involves forming an aqueous slurry of a water soluble magnesium salt, and sodium silicate, and sodium carbonate or sodium hydroxide, and material delivering lithium and fluorine ions selected from the group consisting of (a) lithium fluoride and (b) a lithium compound in conjunction with hydrofluoric acid, fluosilicic acid, sodium silicofluoride or sodium fluoride, such that in the slurry the following atomic ratios are present:

| | |
|---|---|
| Si/F | 0.5–5.1 |
| Li/Mg | 0.1–1.0 |
| Si/(Mg+Li) | 0.5–1.5 |
| Na/(2Mg+F−Li) | 1–2 | the aqueous slurry being formed by coprecipitation by slowly combining the said magnesium salt and sodium silicate and sodium carbonate or hydroxide with heating and agitation in an aqueous medium which contains said material delivering the lithium and fluoride ions, and thereafter taking the aqueous slurry so formed and without washing it free from soluble salts hydrothermally treating it for about 10 to 20 hours to crystallise the synthetic clay. The crystalline material thus obtained has the structural formula given above in which O+ is sodium and which, upon washing, dewatering and drying at a temperature up to 450° C. will yield a product having the Bingham Yield Value specified above. A synthetic silicate in which O+ is an organic ammonium cation may be made by exchanging the sodium cation in the dried synthetic silicate with a desired organic ammonium cation by adding to an aqueous dispersion of the silicate a solution of a salt containing the cation. Alternatively, the sodium cation can be exchanged for the desired organic ammonium cation before washing and drying the silicate. Thus, the product resulting from the hydrothermal treatment may be caused to undergo cation exchange by adding to the silicate suspension a salt containing the cation and thereafter washed and dried. Generally the required excess of organic cation is introduced at the same time as the sodium is replaced with organic cation, but if desired the replacement can be effected first and excess added subsequently.

The organic ammonium cations used may be derived from the class of compounds which includes the salts (including quaternary salts) of primary, secondary and tertiary amines, including mono, di, tri and polyamines as well as aliphatic, aromatic, cyclic and heterocyclic amines and substituted derivatives thereof. Other mono or polyvalent compounds which are of particular value in the practice of the present invention are the so-called "Ethomeens" (Armour and Company). These compounds may be regarded as tertiary amines having a single alkyl group and two polyoxyethylene groups attached to the nitrogen atom. Similarly the so-called "Ethoduomeens" (Armour and Company) are also of value.

The compound employed must have at least one chain of at least eighteen carbon atoms, and may have up to 30, 40 even 50 or more depending on the availability of such materials.

Specific examples of suitable organic ammonium cations are dimethyl dioctadecyl ammonium, trimethyl octadecyl ammonium, octadecyl ammonium, dioctadecyl morpholinium, 1-propyl 2-octadecyl imidazolinium, bis (-2-hydroxyethyl) octadecyl ammonium, and dimethyl benzyl lauryl ammonium. These may be used singly or in combination.

Normally the excess organic cation held in the clay structure will not exceed 100%. The preferred range is 40% to 70%.

The cation exchange capacity of the clay to which we refer indicates the amount of exchangeable cation held by the silicate. The method that is used for determining all cation exchange capacities mentioned herein comprises treating a known weight of the silicate with a 1.0 N. solution of ammonium acetate. This results in replacement of the cation in the clay by the $NH_4$ cation. To ensure complete replacement of all exchangeable cation five or six treatments are normally required. After each treatment the sample is allowed to sediment and the clear liquid decanted. After the final treatment excess ammonium acetate is removed by washing with alcohol.

The sample is then transferred to a long necked flask, an excess of sodium hydroxide added, the ammonia distilled off and collected in a known volume of standard sulphuric acid. When the distillation is complete the ammonia which has been liberated is estimated by back-titrating the remaining acid with a standard solution of alkali. Thus in the invention it is necessary to determine the cation exchange capacity of the silicate having the structural formula described above and then to provide, in the silicate, organic ammonium cation in an amount that is at least 40% in excess of the cation exchange capacity of the clay.

The $d_{001}$ spacing of $38 \pm 3$ A. is a characteristic of the synthetic silicates of the invention containing the organic ammonium cation. If the silicate does not have this $d_{001}$ spacing it is not capable of forming organosols. Most organophilic silicates that are known, for example organic ammonium derivatives of natural hectorite, have $d_{001}$ spacings of 15 to 25 A.

The $d_{001}$ spacing, generally referred to as the "basal spacing," is a conventional measurement in the art. It is usually determined by X-ray analysis using the Debye-Sherrer powder diffraction technique and is the $c$ dimension of the unit cell of the structure (the one perpendicular to the layers).

The synthetic silicates of the invention have the extremely useful property of forming organosols with liquid aliphatic and aromatic hydrocarbons, especially petroleum ether, benzene, tolene, xylene and kerosene. Additionally liquid halogenated aliphatic hydrocarbons may be employed, such as carbon tetrachloride, trichloroethylene and chloroform. They are of course organosols with a disperse phase of substantial inorganic content. When the organosol is mixed with water or an aqueous solution and shaken it forms an aqueous emulsion in which generally the organic liquid is the outer phase.

The following examples are presented by way of illustration rather than limitation. Example 1 describes in detail the preparation of a particularly preferred organic silicate according to the invention while the remaining examples illustrate the properties of this organic silicate and other organic silicates. To determine the properties in each instance 2 grams of dried organic silicate were wetted with 0.4 grams methanol and stirred into 100 grams xylene. The mixtures were put in closed bottles and shaken mechanically for 1 hour or until they appeared visually homogeneous. After standing for 3 to 7 days the dispersions were examined for signs of settlement or gelling. Those dispersions which had not settled, but which remained homogeneous and showed no gel structure were organosols. In the cases where settlement had occurred, i.e. an organosol had not been formed, the volume of the swollen clay was measured and the result was expressed as "swelling volume" in terms of cubic centimeters per gram dry organosilicate. Since all these tests were conducted at 2% concentrations no gels were formed but it was found in further tests that those products that gave organosols at 2% solids concentration remained as mobile clear fluids, i.e. organosols, up to about 10% concentration and only formed gels above that concentration.

I have also conducted tests in which the dried organic silicate was tested with the methanol and then stirred into toluene, instead of xylene. I find that the results in the two methods are substantially identical. I have also conducted tests in which the methanol was added to the xylene or toluene before mixing in the organic silicate. Again the results are substantially identical.

Example 1

296 g. magnesium sulphate heptahydrate were dissolved in 1 litre water and placed in a flask of about 5 litres capacity fitted with a stirrer, a heating mantle and a refluxing condenser. In a separate vessel 26.5 g. lithium carbonate and 43.28 g. sodium hydroxide were added to 200 ml. water and hydrofluoric acid solution was added to it under continuous stirring, until a neutral reaction was indicated by methyl red indicator. The amount required was approximately 240 ml. of a 15% w./w. hydrofluoric acid solution. The second mixture was then added to the first, and they were brought to the boil under reflux while stirring efficiently.

A separate solution consisting of 332 g. of a sodium silicate solution (containing 29 g. $SiO_2$ and 8.8 qg. $Na_2O$ per 100 g.) and 1.6 litre water was then fed slowly into the reaction vessel. The addition was made over a period of about 4 hours while the reaction mixture was kept boiling and stirred efficiently throughout.

A solution of 76.8 g. anhydrous sodium carbonate in 1.1 litre water was then made up and this was also added slowly, over a period of about 4 hours, to the reaction mixture.

The mixture was then boiled under reflux, with efficient stirring for 20 hours. After that, it was filtered under vacuum and washed by filtering 9 litres water through the filter cake. The inorganic clay product has a cation exchange capacity of 100 milliequivalents/100 g. as measured by the chemical analysis method described above.

100 g. of the filter cake prepared as above (corresponding to 20 g. dry solids) were dispersed in 500 ml. of water by stirring for 5 minutes. 26.4 g. of a material sold under the trade name Arquad 2HT-75% T (which material is substantially dimethyl dioctadecyl ammonium chloride of 75% concentration in isopropanol) were dissolved in 1 litre water and added to the first dispersion under vigorous stirring. This quantity of organic compound provides cations in an amount of 170 meq./100 g., i.e. 70% in excess of the equivalent to the cation exchange capacity of the synthetic clay with which it is to be reacted. The dispersed solids were flocculated during the mixing operation and they settled on standing, leaving a clear supernatant liquor which was decanted. The settlement was filtered under vacuum and washed with water until the filtrate was substantially free from chloride. The filter cake was dried in a vacuum oven at 85° C. and ground in a ball mill to a fine powder.

X-ray diffraction analysis of the product showed a $d_{001}$ spacing of 38 to 39 A., indicating that multi-layer deposition of organic material has taken place on the silica layer of the synthetic clay structure. After exhaustive extraction with freshly distilled and neutralized isopropyl extract was analysed. It was found to contain substantially the whole of the 70% excess of organic compound employed in the reaction.

Example 2

The organic silicate of Example 1 was wetted with methyl alcohol and dispersed in xylene at 2% solids content by the method described and a transparent sol with Newtonian flow properties was obtained. The method was repeated using different amounts of the organic silicate in xylene and the viscosity in centipoises is shown in the following table:

| Concentration of the organic synthetic silicate: | Viscosity (cp.) |
|---|---|
| 1% | 1.2 |
| 3% | 2.8 |
| 6% | 8.0 |
| 10% | 24.0 |

The sols were stable and did not break down when heated to 100° C. or cooled to 0° C.

Example 3

The process of Example 1 was repeated four times using different amounts of the Arquad 2 HT. The amounts of Arquad 2 HT used, the resultant excess of cations over cation exchange capacity, the basal spacing and the properties of a 2% composition in xylene are recorded in the following table:

| Test | Amount Arquad 2 HT, g. | Excess cation, percent | $d^{001}$(A.) | 2% xylene composition |
|---|---|---|---|---|
| 3a | 15.5 | 0 | 25 | Sediment—10.9 swelling volume. |
| 3b | 18.6 | 20 | 25 | Sediment—16.9 swelling volume. |
| 3c | 21.8 | 40 | 38 | Sol—no sediment. |
| 3d | 31.0 | 100 | 38 | Do. |

Example 4

The process of Example 1 using, in place of dimethyl dioctadecyl ammonium chloride various other amines in amounts such that in each instance there was a 70% excess of the organic cation. The amines used were butyl amine (4 carbon atoms), octyl amine (8 carbon atoms), "Armene 12D" (12 carbon atoms) and "Armene 16D" (16 carbon atoms). In each instance it was impossible to produce an organosol and, instead, the swelling volume was measured. The results are shown in the following table:

| Amine | $d_{001}$(A.) | Swelling volume in xylene (cm.$^3$g.$^{-1}$) |
|---|---|---|
| Butylamine | 14.7 | 2.5 |
| Octylamine | 14.7 | 2.5 |
| Armeen 12D | 14.4 | 2.5 |
| Armeen 16D | 15.1 | 5.0 |

Example 5

Commercially available organic derivatives of natural hectorite were subjected to the test methods described. In one test the derivative was that sold under the trade name Bentone 27. This was found to have a $d_{001}$ spacing of 18.8 A. and it did not give an organosol. The swelling volume was 16.8. In a second test Bentone 38 was used. This had a $d_{001}$ spacing of 25 A. and again it did not give an organosol. Instead it gave a swelling volume of 22.9.

Example 6

20 grams of purified natural hectorite was dispersed in 1 litre distilled water by stirring for 1 hour and then varying amounts of Arquad 2 HT were added to samples of this dispersion, the samples thereafter being treated as described in Example 1. The cation exchange capacity of the purified natural hectorite was 0.79 meq./g. and the percentage excess, the amount of Arquad 2 HT added to 20 grams hectorite and the swelling volume of the resultant product are shown in the following table. In no case was an organosol obtained.

| Percent excess | Me./g. | Grams Arquad 2 HT per 20 g. hectorite | Swelling volume in xylene (cm.$^3$g.$^{-1}$) |
|---|---|---|---|
| 0 | 0.79 | 12.2 | 21.4 |
| 20 | 0.95 | 14.7 | 21.0 |
| 40 | 1.11 | 17.2 | 16.4 |
| 100 | 1.58 | 24.5 | 16.0 |

I claim:

1. A synthetic silicate structurally analogous to natural hectorite and which is capable of forming an organosol, said silicate having
   (a) the general formula $$[Si_8.Mg_{6-x}.Li_x.O_{20}(OH)_{4-y}.F_y]^{x(-)}.xO+$$

where O+ is an equivalent of an exchangeable organic ammonium cation having at least one chain of at least 18 carbon atoms, the other substituents on the ammonium cation being independently selected from the hydrogen, aliphatic hydrocarbons, aromatic hydrocarbons, cyclic hydrocarbons and two polyoxyethylene groups, provided that the cation is a tertiary amine having a single alkyl group when the substituents are the two polyoxyethylene groups, $x$ is greater than zero, but less than 6; $y$ is at least 1, but less than 4;
   (b) a $d_{0001}$ spacing of 38±3 A.; and
   (c) containing the organic ammonium cation held within the structure of the synthetic swelling clay to an amount of at least about 40% in excess of the cation exchange capacity of the clay.

2. A synthetic swelling clay as claimed in claim 1, wherein the exchangeable organic cation is selected from the group consisting of dimethyl dioctadecyl ammonium, trimethyl octadecyl ammonium, octadecyl ammonium, bis(-2-hydroxyethyl) octadecyl ammonium dimethyl benzyl lauryl ammonium, or mixtures of these cations.

3. A synthetic swelling clay as claimed in claim 1, wherein the organic cation is dimethyl dioctadecyl ammonium.

4. A synthetic swelling clay as claimed in claim 1, having characteristic (c) in the range 40 to 70%.

References Cited

UNITED STATES PATENTS

| | | | |
|---|---|---|---|
| 3,356,611 | 12/1967 | Walker et al. | 252—28 |
| 2,831,809 | 4/1958 | Peterson | 252—28 |
| 3,239,521 | 3/1966 | Weldes | 260—448.2 N X |
| 3,239,549 | 3/1966 | Weldes | 260—448.2 N |
| 3,326,910 | 6/1967 | Weldes | 260—247 |
| 3,338,901 | 8/1967 | Weldes | 260—268 |
| 3,383,386 | 5/1968 | Weldes | 260—448.2 N X |

DANIEL E. WYMAN, Primary Examiner

P. F. SHAVER, Assistant Examiner

U.S. Cl. X.R.

252—28; 260—247 R, 268 R, 282, 448.8 R